United States Patent
Kwon et al.

(10) Patent No.: US 7,508,649 B2
(45) Date of Patent: Mar. 24, 2009

(54) MULTI-LAYERED DIELECTRIC FILM OF MICROELECTRONIC DEVICE AND METHOD OF MANUFACTURING THE SAME

(75) Inventors: Dae-jin Kwon, Suwon-si (KR); Seok-jun Won, Seoul (KR); Weon-hong Kim, Suwon-si (KR); Yong-kuk Jeong, Seoul (KR); Min-woo Song, Seongnam-si (KR); Jung-min Park, Jeollabuk-do (KR)

(73) Assignee: Samsung Electronics Co., Ltd. (KR)

( * ) Notice: Subject to any disclaimer, the term of this patent is extended or adjusted under 35 U.S.C. 154(b) by 343 days.

(21) Appl. No.: 11/335,411

(22) Filed: Jan. 19, 2006

(65) Prior Publication Data

US 2006/0158829 A1 Jul. 20, 2006

(30) Foreign Application Priority Data

Jan. 19, 2005 (KR) .................... 10-2005-0005046

(51) Int. Cl.
*H01G 4/06* (2006.01)
*H01G 4/20* (2006.01)

(52) U.S. Cl. ...................... 361/311; 361/313

(58) Field of Classification Search ............ 361/311, 361/313; 257/310
See application file for complete search history.

(56) References Cited

U.S. PATENT DOCUMENTS

| 6,407,435 | B1 | 6/2002 | Ma et al. ............ 257/411 |
| 6,875,667 | B2 | 4/2005 | Iizuka et al. ......... 438/381 |
| 2003/0129446 | A1 * | 7/2003 | Girardie ............ 428/689 |
| 2004/0195653 | A1 | 10/2004 | Morozumi et al. |

FOREIGN PATENT DOCUMENTS

| JP | 2003-309118 | 10/2003 |
| JP | 2004-134579 | 4/2004 |

* cited by examiner

*Primary Examiner*—Eric Thomas
(74) *Attorney, Agent, or Firm*—Mills & Onello LLP

(57) ABSTRACT

Multi-layered dielectric films which can improve the performance characteristics of a microelectronic device are provided as well as methods of manufacturing the same. The multi-layered dielectric film includes a single component oxide layer made of a single component oxide, and composite components oxide layers made of a composite components oxide including two or more different components formed along either side of the single component oxide layer without a layered structure.

14 Claims, 4 Drawing Sheets

MULTI-LAYERED DIELECTRIC FILM OF MICROELECTRONIC DEVICE AND METHOD OF MANUFACTURING THE SAME

This application claims priority from Korean Patent Application No. 10-2005-0005046 filed on Jan. 19, 2005 in the Korean Intellectual Property Office, the disclosure of which is incorporated herein by reference in its entirety.

BACKGROUND OF THE INVENTION

1. Field of the Invention

The present invention relates to films useful in or for forming microelectronic devices and to methods of manufacturing the same, and more particularly, to multi-layered dielectric films which can improve the performance characteristics of microelectronic devices which incorporate such films, and to methods of manufacturing the same.

2. Description of the Related Art

As semiconductor devices have become increasingly highly integrated, the area of a unit cell of such semiconductor devices has become smaller. Accordingly, cell capacitance has been reduced. A reduction in the cell capacitance, however, adversely affects an integration level, which will be described by reference to examples of various types of electronic devices.

In connection with a high voltage (e.g., 15 V or greater) device, such as a liquid crystal display (LCD) drive IC (LDI), reducing cell capacitance may increase a boosting frequency resulting in a large amount of power dissipation. In addition, there may be a limitation in reducing the entire chip size. In connection with a memory device, the reading capability of a cell is degraded by reducing cell capacitance, and a soft error rate increases. In addition, low voltage driving of such a device is difficult to achieve, and overly excessive power dissipation may be caused during the operation of the device. As such, in order to manufacture a high-voltage semiconductor device or a memory device with an ultrahigh integration level but without these capacitance-related drawbacks, it is necessary to develop a method of increasing cell capacitance, that is, capacitance per unit area.

In general, the dielectric property of the dielectric layer used in a capacitor can be evaluated by an equivalent oxide film thickness (known as a Toxeq value) and by a leakage current density. The equivalent oxide film thickness (Toxeq) is a value obtained by converting a thickness level of a dielectric film formed of a dielectric material other than a silicon oxide into an equivalent thickness level of a dielectric film made of a silicon oxide. As the Toxeq value is reduced, cell capacitance per unit area increases.

The leakage current density is also associated with the electrical characteristics of a capacitor and with power dissipation. That is, the smaller the leakage current density of a semiconductor device, the better the electrical characteristics of the device.

In order to increase the cell capacitance of a semiconductor device, a combination of a silicon oxide ($SiO_2$) layer (hereinafter referred to as the 'O' layer) and a silicon nitride layer ($Si_3N_4$) (hereinafter referred to as the 'N' layer) has been used in the prior art as a dielectric film of a capacitor. However, as shown in FIG. 1 (representing prior art technology), the dielectric constant of the silicon oxide ($SiO_2$) film and the silicon nitride ($Si_3N_4$) film are only 5 and 10, respectively. Thus, there is a serious limitation in trying to increase capacitance using only materials having a relatively low dielectric constant.

Accordingly, research into forming a high-k dielectric film made of a material having a relatively high dielectric constant has been actively conducted in an effort to find a substitute for silicon oxide or silicon nitride films. As such, currently, considerable attention is being paid to a variety of high-k metal oxide materials as possible dielectric film materials for use in the formation of a capacitor element or layer of a semiconductor device. Identifying high-k dielectric materials which are suitable for semiconductor applications, and finding effective ways to form uniform, controlled-thickness films of such materials, however, have proven to be challenging obstacles to advancement in this field.

These and other problems with and limitations of the prior art approaches are addressed in whole or at least in part by the dielectric films and the related formation methods of this invention.

SUMMARY OF THE INVENTION

The present invention provides high dielectric constant dielectric films suitable for use in high voltage microelectronic devices and methods of manufacturing the same.

The present invention also provides microelectronic devices with improved performance characteristics comprising dielectric films in accordance with this invention and methods of manufacturing the same.

According to an aspect of the present invention, there is provided a multi-layered dielectric film comprising: a single component oxide layer; and composite components oxide layers each of the composite components oxide layers being without a layered structure and formed along either side of the single component oxide layer.

In one embodiment, the single component oxide layer has a higher dielectric constant than that of the composite components oxide layers.

In another embodiment, the single component oxide layer comprises a single component oxide wherein the component is selected from the group consisting of aluminum (Al), hafnium (Hf), zirconium (Zr), lanthanum (La), silicon (Si), tantalum (Ta), strontium (Sr), barium (Ba), lead (Pb), chromium (Cr), molybdenum (Mo), tungsten (W), titanium (Ti), yttrium (Y), and manganese (Mn).

In another embodiment, the single component oxide layer comprises tantalum oxide.

In another embodiment, the composite components oxide layer comprises a composite components oxide represented by the general chemical formula $M1_xM2_yO_z$, wherein M1 and M2 may be the same or different components selected from the group consisting of aluminum (Al), hafnium (Hf), zirconium (Zr), lanthanum (La), silicon (Si), tantalum (Ta), strontium (Sr), barium (Ba), lead (Pb), chromium (Cr), molybdenum (Mo), tungsten (W), titanium (Ti), yttrium (Y), and manganese (Mn), and wherein x, y and z have numerical values that denote the stoichiometric ratio of M1, M2 and O.

In another embodiment, at least one of the composite components oxide layers comprises at least one of a composite components oxide selected from the group consisting of $Al_xHf_yO_z$, $Al_xTa_yO_z$, $Hf_xSi_yO_z$, $Hf_xTa_yO_z$, $Hf_xTi_yO_z$, $Al_xTi_yO_z$, $Zr_xTa_yO_z$, $Zr_xSi_yO_z$, and $Zr_xTi_yO_z$.

In another embodiment, at least one of the composite components oxide layers comprises $Al_xHf_yO_z$.

In another embodiment, each of the composite components oxide layers has a dielectric constant (∈) in the range of 9<∈<30.

In another embodiment, at least one of the composite components oxide layers formed along either side of the single component oxide layer is thermally treated.

In another embodiment, at least one of the composite components oxide layers formed along either side of the single component oxide layer comprises components wherein at least one is the same component as in the single component oxide layer.

In another embodiment, at least one of the composite components oxide layers formed along either side of the single component oxide layer comprises different components than the component of the single component oxide layer.

According to a further aspect of the present invention, there is provided a microelectric device comprising a multi-layered dielectric film according to the above as a dielectric film for a capacitor.

According to a further aspect of the present invention, there is provided a capacitor comprising: a lower electrode; a multi-layered dielectric film including composite components oxide layers made of $Al_xHf_yO_z$, wherein x, y and z have numerical values that denote the stoichiometric ratio of Al, Hf and O, formed along either side of a single component oxide layer made of a tantalum oxide, said multi-layered dielectric film being formed on the lower electrode; and an upper electrode formed on the multi-layered dielectric film.

In one embodiment, at least one of the composite components oxide layers has a dielectric constant (∈) in the range of 9<∈<30.

In another embodiment, the upper electrode and the lower electrode are each made of TiN.

According to a further aspect of the present invention, there is provided a method of manufacturing a multi-layered dielectric film, the method comprising: forming a single component oxide layer; and forming a composite components oxide layer without a layered structure along either side of the single component oxide layer.

In one embodiment, the single component oxide layer is made of a material having a higher dielectric constant than that of either of the composite components oxide layers. In another embodiment, the single component oxide layer is made of a single component oxide wherein the component is selected from the group consisting of aluminum (Al), hafnium (Hf), zirconium (Zr), lanthanum (La), silicon (Si), tantalum (Ta), strontium (Sr), barium (Ba), lead (Pb), chromium (Cr), molybdenum (Mo), tungsten (W), itanium (Ti), yttrium (Y), and manganese (Mn).

In another embodiment, the single component oxide layer is made of a tantalum oxide.

In another embodiment, the composite components oxide layers are made of a composite components oxide represented by the general chemical formula $M1_xM2_yO_z$, wherein M1 and M2 may be the same or different components selected from the group consisting of aluminum (Al), hafnium (Hf), zirconium (Zr), lanthanum (La), silicon (Si), tantalum (Ta), strontium (Sr), barium (Ba), lead (Pb), chromium (Cr), molybdenum (Mo), tungsten (W), titanium (Ti), yttrium (Y), and manganese (Mn), and wherein x, y and z have numerical values that denote the stoichiometric ratio of M1, M2 and O.

In another embodiment, at least one of the composite components oxide layers is made of a composite components oxide selected from the group consisting of $Al_xHf_yO_z$, $Al_xTa_yO_z$, $Hf_xSi_yO_z$, $Hf_xTa_yO_z$, $Hf_xTi_yO_z$, $Al_xTi_yO_z$, $Zr_xTa_yO_z$, $Zr_xSi_yO_z$, and $Zr_xTi_yO_z$.

In another embodiment, at least one of the composite components oxide layers formed along either side of the single component oxide layer includes one of the same component as in the single component oxide layer.

In another embodiment, at least one of the composite components oxide layers formed along either side of the single component oxide layer is made of different components than the single component oxide layer.

In another embodiment, the process of forming at least one of the composite components oxide layers comprises a process cycle including the steps of simultaneously supplying M1 and M2 sources, supplying a purge gas, supplying an oxygen gas, and supplying a purge gas.

In another embodiment, the process of forming at least one of the composite components oxide layers comprises a process cycle including the steps of supplying an M1 source, supplying a purge gas, supplying an M2 source, supplying a purge gas, supplying an oxygen gas, and supplying a purge gas.

According to a further aspect of the present invention, there is provided a method of manufacturing a microelectric device comprising using a multi-layered dielectric film fabricated in accordance with any of the methods described herein as a dielectric film for the capacitor.

According to a further aspect of the present invention, there is provided a method of manufacturing a capacitor, the method comprising: forming a lower electrode; forming a multi-layered dielectric film including composite components oxide layers made of $Al_xHf_yO_z$, wherein x, y and z have numerical values that denote the stoichiometric ratio of Al, Hf and O, formed along either side of a single component oxide, layer made of a tantalum oxide, said multi-layered dielectric film being formed on the lower electrode; and forming an upper electrode on the multi-layered dielectric film.

In one embodiment, at least one of the composite components oxide layers has a dielectric constant (∈) in the range of 9<∈<30.

In another embodiment, the process of forming at least one of the composite components oxide layers comprises a process cycle including the steps of simultaneously supplying aluminum and hafnium sources, supplying a purge gas, supplying an oxygen gas, and supplying a purge gas.

In another embodiment, the process of the forming at least one of the composite components oxide layers comprises a process cycle including the steps of supplying an aluminum source, supplying a purge gas, supplying a hafnium source, supplying a purge gas, supplying an oxygen gas, and supplying a purge gas.

In another embodiment, the upper electrode and the lower electrode are each made of TiN.

These and other aspects and advantages of the present invention will be described below by reference to the following drawings.

BRIEF DESCRIPTION OF THE DRAWINGS

The above and other features and advantages of the present invention will become more apparent by describing in detail exemplary embodiments thereof with reference to the attached drawings in which.

Figure 1:
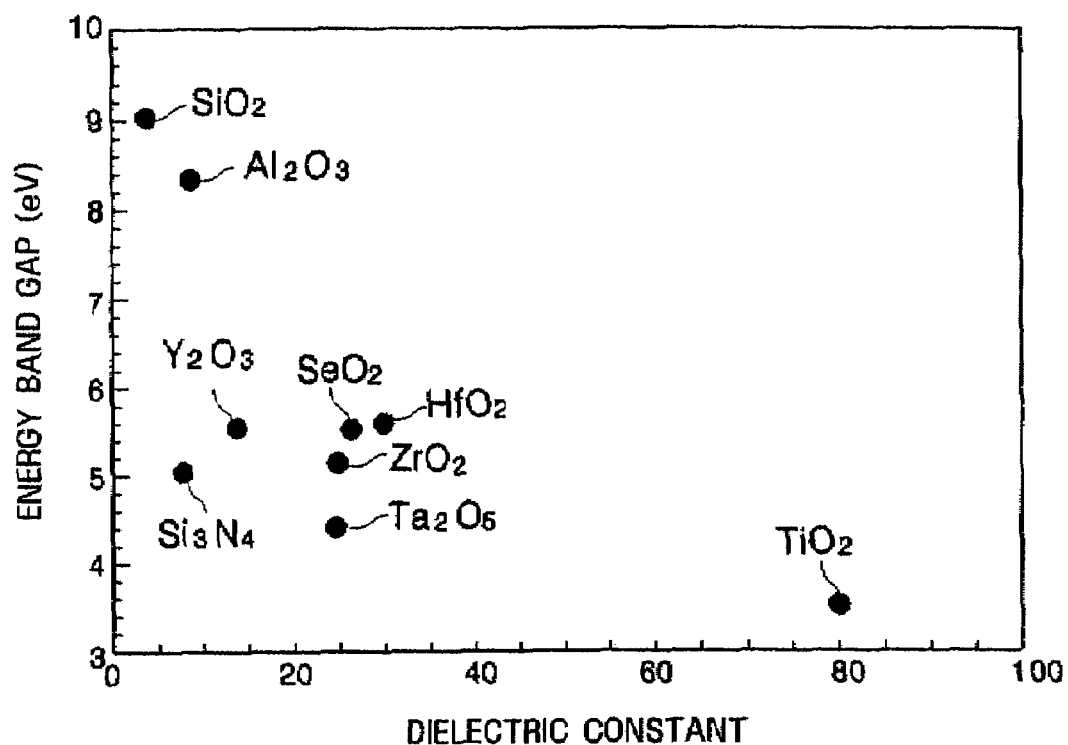
FIG. 1 shows energy band gaps and dielectric constants of various materials commonly used in prior art dielectric films.

dielectric film (which is not according to the present invention) with capacitors including a dielectric film according to an embodiment of the present invention.

DETAILED DESCRIPTION OF THE INVENTION

The present invention will now be described more fully with reference to the accompanying drawings, in which preferred embodiments of this invention are shown. Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and it will be understood that the present invention will be defined by the appended claims. Like reference numerals refer to like elements throughout the specification.

FIG. 1 illustrates the energy band gap and the dielectric constant characteristics for various materials commonly used in prior art dielectric films. The relevance of FIG. 1 to this invention will become clear in the following description.

Preferred embodiments of the present invention will be best understood with reference to FIGS. 2 through 6.

Figure 2:
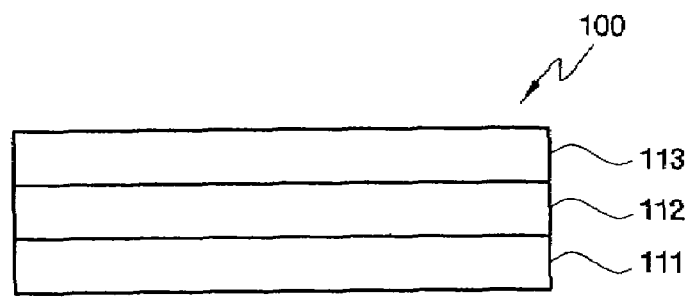
FIGS. 2 through 4 are schematic cross-sectional views of dielectric films according to first, second and third embodiments of the present invention, respectively.

FIG. 2 is a schematic cross-sectional view of a dielectric film according to first embodiment of the present invention.

Referring to FIG. 2, a dielectric film 100 according to a first embodiment of the present invention is formed in a multilayered film structure, in particular, in a structure in which a first composite components oxide layer 111, a single component oxide layer 112, and a second-composite components oxide layer 113 are sequentially stacked.

The first and second composite components oxide layers 111, 113 formed at either side of (or below and above) the single component oxide layer 112, and between which the single component oxide layer 112 is interposed, are each made of an oxide including two or more different components with a composite layer structure in which a layered structure made of an oxide is not formed.

Each of the first and second composite components oxide layers 111 and 113 is preferably made of an oxide including two or more different components, so that each of these composite components oxide layers has a large band gap and becomes less dependent upon the temperature varying with a tunneling mechanism. In addition, each of the first and second composite components oxide layers 111, 113 is preferably made of an oxide capable of maintaining coherency with the single component oxide layer 112 sandwiched between the composite components oxide layers 111 and 113. Further, each of the composite components oxide layers 111, 113 is preferably made of an oxide having high coherency with an overlying or underlying structure, such as an upper electrode or a lower electrode, formed along the other (non-sandwich) side of each composite components oxide layer 111, 113, and also having a low interface trap density (Dit). In addition, each of the composite components oxide layers 111, 113 is preferably made of a material having a more negative heat of formation value than that of an adjacent structure so as to provide chemical stability during a formation process and being capable of preventing an unnecessary interface layer that increases the thickness of an equivalent oxide, such as silicon oxide, from being formed. Each of the first and second composite components oxide layers 111 and 113 is preferably also made of a material capable of maintaining an amorphous state even under high temperature annealing conditions that might be used for completing fabrication of a microelectronic device, such as a capacitor, while at the same time preventing formation of a crystalline grain boundary through which a leakage current may flow, which will later be described.

It is also preferred that at least one of the two different components for forming the first and second composite components oxide layers 111, 113 is the same material, or in the same group of materials, as the component of the oxide forming the single component oxide layer 112 so that coherency of layers 111, 113 with the single component oxide layer 112 can be improved. In addition, two or more different oxides can be combined with one another to form layers 111, 113 so that a net fixed charge of each of the composite components oxide layers 111, 113 is minimized. The net fixed charge is reduced so that channel mobility of coulomb scattering can be prevented from being reduced by a fixed charge.

The oxides useful for forming the composite components oxide layers 111, 113 can be represented by the general chemical formula $M1_xM2_yO_z$, wherein M1 and M2 may be the same or different components selected from the group consisting of aluminum (Al), hafnium (Hf), zirconium (Zr), lanthanum (La), silicon (Si), tantalum (Ta), strontium (Sr), barium (Ba), lead (Pb), chromium (Cr), molybdenum (Mo), tungsten (W), titanium (Ti), yttrium (Y), and manganese (Mn), and wherein x, y and z have numerical values that denote the stoichiometric ratio of M1, M2 and O. The x- and y-values, which determine the ratio of M1 to M2 in the oxide, are set in a range such that a net fixed charge is minimized or 0, which represents a high dielectric constant characteristic, and simultaneously forms as an amorphous state at a high crystallization temperature.

More specifically, each composite components oxide layer 111, 113 may be made of an oxide selected from the group consisting of $Al_xHf_yO_z$, $Al_xTa_yO_z$, $Hf_xSi_yO_z$, $Hf_xTa_yO_z$, $Hf_xTi_yO_z$, $Al_xTi_yO_z$, $Zr_xTa_yO_z$, $Zr_xSi_yO_z$, and $Zr_xTi_yO_z$, wherein x, y and z have numerical values that denote the stoichiometric ratios of the various elements. In particular, the composite components oxide layers 111, 113 may be made of an oxide such as $Al_xHf_yO_z$. Referring to FIG. 1, it can be seen that aluminum oxide ($Al_2O_3$) used by itself has a dielectric constant of about 9 and hafnium oxide ($HfO_2$) used by itself has a dielectric constant of about 30. Thus, a composite components oxide layer such as 111, 113 made of $Al_xHf_yO_z$ has a dielectric constant ($\in$) located in a range in which $9<\in<30$ (assuming neither x nor y has a value of 0).

It has been found that as the proportion of Hf or of Zr in the composite components oxide layers 111, 113 increases, the dielectric constant of the composite components oxide layers 111, 113 also increases while decreasing a crystallization temperature, so that a dielectric film 100 including an Hf or Zr-containing material is easily crystallized, thereby causing a leakage current. In addition, it has been found that, as the proportion of Ta or Ti in the composite components oxide layers 111, 113 increases, the dielectric constant of the composite components oxide layers 111, 113 also increases. However, a dielectric layer 100 including Ta or Ti-containing materials rapidly deteriorates over measurement temperatures. In accordance with this invention, these several disadvantages generated due to crystallization temperature, rapid deterioration or the like experienced when using a conventional dielectric material by itself as a dielectric layer, can be overcome by forming the composite components oxide layers 111, 113 using an oxide made of a combination of the above-described components.

The composite components oxide layers 111, 113 made of the combination of the above-described component oxides according to this invention comprise composite layers without forming a layered structure.

Conventionally, in order to partially prevent a leakage current or breakdown voltage deterioration due to a local defect formed in the dielectric film under conditions of applied high voltage, a laminate-type dielectric film has been manufactured by inserting an oxide layer having stable components between the several layers forming the dielectric film, thereby avoiding concentration of local defects. However, some local defects would still exist in the conventional laminate-type dielectric films, causing a leakage current or breakdown voltage deterioration due to such local defects.

By contrast, the dielectric film 100 according to the first embodiment of the present invention includes the composite components oxide layers 111, 113, each having a composite structure in which a layered structure of an oxide is not formed, which structure has been found substantially to eliminate the likelihood of generating defects so that a leakage current or breakdown voltage deterioration can be prevented.

When the composite components oxide layers 111, 113 are formed along either side of the single component oxide layer 112 in accordance with this invention, the composite components oxide layers 111, 113 may be made of the same composite components oxide, having the same components and the same composition ratios or, alternatively, of composite oxides having different components and/or different composition ratios.

Each of the composite components oxide layers 111 and 113 comprising the dielectric film 100 according to the first embodiment of the present invention has a sufficient thickness to satisfy the above-described performance characteristics such that no breakdown is generated at a rated operating voltage as required in a microelectronic device embodying the dielectric film 100. Thus, for example, the thicknesses of the composite components oxide layers 111, 113 may typically be in a range of about 30 to 250 Å.

The single component oxide layer 112 sandwiched between the composite components oxide layers 111 and 113 is preferably made of a high dielectric material that can maximize the entire dielectric constant of the dielectric film. That is, the dielectric constant of the single component oxide layer 112 is made of a high dielectric material having a dielectric constant that is the same as or higher than that of either of the composite components oxide layers 111, 113. Considering the electrical characteristics of the composite components oxide layers 111, 113 and the capacitance characteristics of the single component oxide layer 112, the thickness of the single component oxide layer 112 may typically be in a range of about 30 to 300 Å.

In addition, the single component oxide layer 112 is preferably made of a material capable of maintaining coherency with each of the composite components oxide layers 111, 113 formed along either side of the single component oxide layer 112. In addition, the single component oxide layer 112 is preferably formed a material capable of maintaining an amorphous state even under subsequent high temperature annealing conditions used for completing fabrication of a microelectronic device, such as a capacitor, while preventing formation of a crystalline grain boundary through which current may flow, as will later be described.

Thus, in one preferred embodiment, the single component oxide layer 112 may be made of one oxide with a component selected from the group consisting of aluminum (Al), hafnium (Hf), zirconium (Zr), lanthanum (La), silicon (Si), tantalum (Ta), strontium (Sr), barium (Ba), lead (Pb), chromium (Cr), molybdenum (Mo), tungsten (W), titanium (Ti), yttrium (Y), and manganese (Mn). However, the present invention is not limited to this embodiment, and the single component oxide layer 112 may also be made of another material suitably used in the present invention within the spirit and scope of the present invention. In a particular embodiment, the single component oxide layer 112 may be made of a tantalum oxide.

Figure 3:
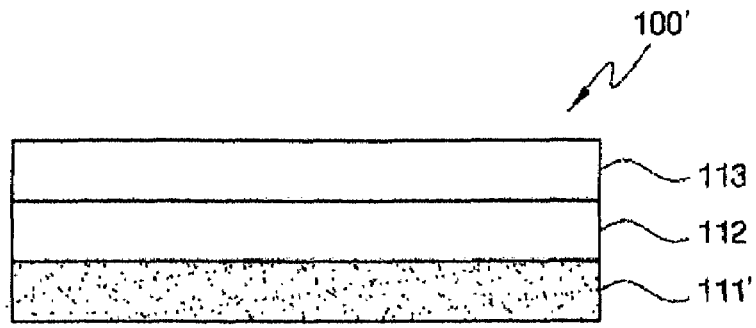

FIG. 3 is a schematic cross-sectional view of a dielectric film according to a second embodiment of the present invention.

Referring to FIG. 3, a dielectric film 100' according to a second embodiment of the present invention is formed in a structure in which a first composite components oxide layer 111', a single component oxide layer 112, and a second composite components oxide layer 113 are sequentially stacked. The composite components oxide layer 111' of the composite components oxide layers 111' and 113 respectively formed along either side of the single component oxide layer 112 has improved interface characteristics as a result of being subjected to a thermal treatment. The dielectric film 100' according to the second embodiment of the present invention is substantially the same as the dielectric film 100 according to the first embodiment of the present invention except in the characteristic that one of the two composite components oxide layers, namely layer 111', included in the dielectric film 100' according to the second embodiment of the present invention is a thermally-treated composite components oxide layer.

Figure 4:
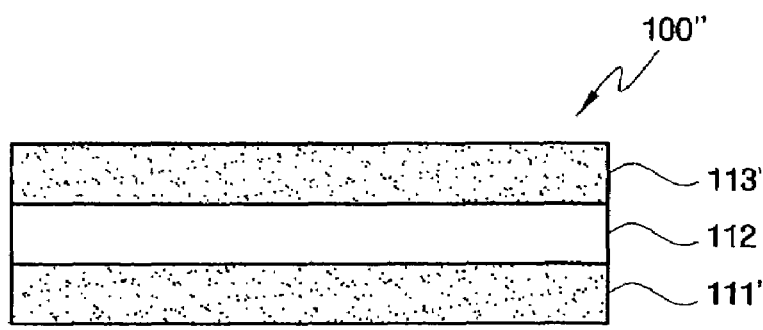

FIG. 4 is a schematic cross-sectional view of a dielectric film according to a third embodiment of the present invention.

Referring to FIG. 4, a dielectric film 100" according to a third embodiment of the present invention is formed in a structure in which a first composite components oxide layer 111', a single component oxide layer 112, and a second composite components oxide layer 113' are sequentially stacked. Each of the two composite components oxide layers 111' and 113' respectively formed along either side of the single component oxide layer 112 have improved interface characteristics as a result of being subjected to a thermal treatment. The dielectric film 100" according to the third embodiment of the present invention is substantially the same as the dielectric film 100 according to the first embodiment of the present invention except in the characteristic that each of the two composite components oxide layers 111' and 113' included in the dielectric film 100" according to the third embodiment of the present invention have been thermally treated.

Each of the dielectric films 100, 100' or 100" according to the first through third embodiments of the present invention as described above, may be advantageously used in manufacturing a variety of microelectronic devices. The dielectric film 100, 100' or 100" according to the first through third embodiments of the present invention may be used as a dielectric film for a capacitor used, for example, in a volatile memory device such as DRAM or SRAM or EEPROM, in a nonvolatile memory device such as a flash memory device, in a logic device, in a microelectro mechanical system (MEMS) device, in an optoelectronic device, or in a display device. In each case, the dielectric film 100, 100' or 100" may be applied regardless of the shape of the capacitor needed for such microelectronic device. The dielectric film 100, 100' or 100" may be applied to a capacitor in which a dielectric film is formed planarly between conductors, or to a cubic capacitor such as a cylindrical, pin-shaped or stack-shaped capacitor; and, there are many other examples as will be apparent to those skilled in this art.

In addition, a silicon substrate, a silicon-on-insulator (SOI) substrate, a gallium arsenic substrate, a silicon germanium substrate, a ceramic substrate or a quartz substrate among others, may be used as a substrate on which the dielectric film 100, 100' or 100" according to the first through third embodiments of the present invention is formed; and, again, this is only one example of the many utilities of the dielectric films formed according to this invention. A silicon substrate that is commonly used in dielectric applications will now be described in the following embodiments.

Figure 5:
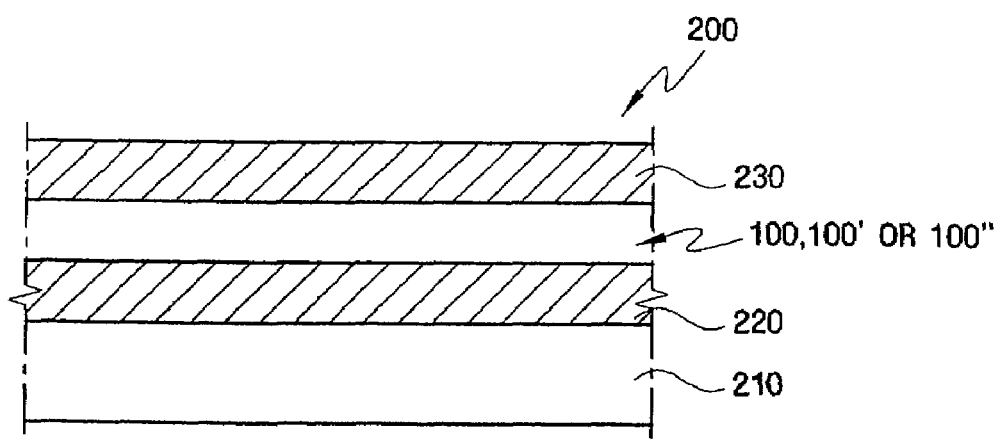
FIG. 5 is a schematic cross-sectional view of a capacitor which includes a dielectric film according to embodiments of the present invention.

FIG. 5 is a schematic cross-sectional view of a capacitor including a dielectric film according to any of the embodiments of the present invention.

Referring to FIG. 5, a dielectric film 100, 100' or 100" according to the first through third embodiments of the present invention is formed between a capacitor lower electrode 220, which is formed on a silicon substrate 210, and a capacitor upper electrode 230. The capacitor lower electrode 220 may be formed in a single shape made for example, of doped polysilicon, a metallic material such as W, Pt, Ru or Ir, conductive metallic nitride such as TiN, TaN or WN, metallic oxide such as $RuO_2$ or $IrO_2$, or a composite shape made of two or more such materials. The capacitor upper electrode 230 may be formed in a single shape made, for example, of doped polysilicon, a metallic material such as W, Pt, Ru or Ir, conductive metallic nitride such as TiN, TaN or WN, metallic oxide such as $RuO_2$ or $IrO_2$, or a composite shape made of two or more such materials as previously described in connection with the capacitor lower electrode 220. However, a material used for the capacitor upper electrode 230 does not necessarily need to be the same as the material used for the capacitor lower electrode 220. In a particular embodiment, for example, the lower electrode 220 and the upper electrode 230 of the capacitor 200 may be TiN, and the dielectric film 100, 100' or 100" may include composite components oxide layers made of $Al_xHf_yO_z$ along either side of a single component oxide layer made of a tantalum oxide.

The capacitor 200 of FIG. 5 may be a metal-insulator-metal (MIM)-type capacitor, a metal-insulator-silicon (MIS)-type capacitor, a pn junction capacitor, or a polysilicon-insulator-polysilicon (PIP)-type capacitor. In a particular embodiment, for example, the capacitor 200 of FIG. 5 may be a MIM-type capacitor.

A method of manufacturing the dielectric film according to the third embodiment of the present invention will now be described by reference to the process flow diagram of FIG. 6.

First, a substrate in which a lower structure, such as a lower electrode as shown in FIG. 5, is formed is prepared in operation S1.

Subsequently, a composite lower film layer is formed on the lower electrode structure in operation S2.

Hereinafter, the composite components oxide layer formed on the lower electrode structure is referred to as a first composite components oxide layer 111'. The first composite components oxide layer 111' may be formed using known deposition methods, such as chemical vapor deposition (CVD), low pressure chemical vapor deposition (LP CVD), plasma enhanced chemical vapor deposition (PE CVD), and sputtering. The first composite components oxide layer 111', however, is formed at a higher temperature than is typically employed using such deposition methods. Consequently, according to such deposition methods, thermal effects that are disadvantageous to semiconductor devices may be exhibited by the layer 111'.

On the other hand, an atomic layer deposition (ALD) process can be effectively performed at a lower temperature than CVD. Accordingly, by using an ALD process, deleterious thermal effects can be reduced and layer uniformity is enhanced. Thus, in the manufacturing of the dielectric film 100" according to the third embodiment of the present invention, the composite components oxide layer 111' may preferably be formed using the ALD process. By using the ALD process, a variety of precursors can be used, and the thickness of a layer can be precisely controlled.

An ALD process for forming the first composite components oxide layer 111' comprising an oxide having two or more different components without a layered structure may include a process cycle comprising the sequential steps of: (a) simultaneously supplying a first metal or nonmetal source of the component M1 and a second metal or nonmetal source of the component M2; and (b) thereafter sequentially supplying a purge gas, an oxygen source, and a purge gas. In such an ALD process, formation conditions of the first composite components oxide layer 111' are determined depending on whether or. not an amorphous material is to be formed or not, which is due to a high crystallization temperature. Additionally, a net fixed charge can be minimized or not, and high voltage resistance can be maximized or not.

More specifically, in order to form the composite components oxide layer 111' made of, for example, $Al_xHf_yO_z$, without a layered structure, trimethylaluminum (TMA) or triethyl aluminum (TEA) may be used as an aluminum M1 source. Specifically, TMA may be suitably used as the M1 source. In addition, $HfCl_4$, $Hf(OtC_4H_9)_4$, $Hf(OC_2H_5)_4$, $Hf(N(C_2H_5)_2)_4$, $Hf(N(CH_3)_2)_4$, and $Hf(dmae)_4$ (dmae is dimethylamin) may be used as a hafnium M2 source. Specifically, $Hf(N(C_2H_5)_2)_4$ may be suitably used as the M2 source.

If the aluminum M1 source and the hafnium M2 source are simultaneously supplied to a suitable surface, such as the capacitor lower electrode 220 seen in FIG. 5, the aluminum M1 source and the hafnium M2 source are absorbed onto the lower structure by chemical absorption to form chemical absorption material, and then may be further deposited on the chemical absorption material by physical absorption. At this stage, if a purge gas such as $N_2$ is supplied to eliminate residual impurities, only chemically adsorbed materials remain in a solid state.

Thereafter, aluminum and hafnium that are chemically adsorbed on the lower structure are oxidized by supplying an oxygen source so that a first composite components oxide layer without a layered structure is formed on the lower structure. The oxygen source may, for example, be $H_2O$, $O_3$, O radical, alcohol (e.g., isopropylalcohol), $D_2O$, $H_2O_2$, $O_2$, $N_2O$ or NO. In addition, other suitable oxygen sources within the spirit and scope of the present invention may also be used.

The first composite components oxide layer as described above can be deposited using the ALD process at a temperature in a range of 200 to 600° C.

In another invention embodiment, the ALD process of forming the first composite components oxide layer including an oxide having two or more different components without forming a layered structure may also include a process cycle comprising the sequential steps of: supplying a metal or nonmetal M1 source, supplying a purge gas, supplying a different metal or nonmetal source, supplying a purge gas, supplying an oxygen source, and supplying a purge gas.

More specifically, if the aluminum M1 source is supplied to form a composite components oxide layer made of, for example, $Al_xHf_yO_z$, without a layered structure, the aluminum M1 source is absorbed onto the lower structure by chemical absorption to form a chemical absorption material containing aluminum and further deposition of the M1 source on the chemical absorption material may then occur by physical absorption. Then, if a purge gas such as $N_2$ is supplied to eliminate residual impurities, only the chemically adsorbed material containing aluminum remains in a solid state on the lower structure.

Next, if a hafnium source is supplied, the hafnium source is absorbed onto the surface of the chemically absorbed material containing aluminum by chemical absorption, and further deposition of the hafnium source on the chemical absorption material may then occur by physical absorption. Then, if a purge gas such as $N_2$ is supplied to eliminate residual impurities, only the chemically adsorbed material remains in a solid state.

Subsequently, aluminum and hafnium that are chemically adsorbed on the lower structure are oxidized by supplying an oxygen source so that a first composite components oxide layer without a layered structure is formed on the lower structure. The first composite components oxide layer as described above may be deposited using the ALD process at about 200 to 600° C. The first composite components oxide layer formed as described above is preferably then thermally treated in an oxygen atmosphere. A thermal treatment process is performed to improve interface characteristics of the first composite components oxide layer. Thus, for example, the first composite components oxide layer may be thermally treated in an atmosphere of $O_3$, $O_2$, plasma or dry $O_2$ at about 450° C. for about 30 minutes to one hour. The first composite components oxide layer may alternatively be thermally treated at a temperature of about 500 to 600° C. for several seconds. It will be understood, however, that the present invention is not limited to these specific exemplary embodiments.

The dielectric constant of the first composite components oxide layer without a layered structure formed using the ALD process as described above is in the range of $9 < \in < 30$.

Subsequently, a single component oxide layer such as layer 112 as seen in FIGS. 2, 3 and 4, is formed on the first composite components oxide layer in operation S3 of FIG. 6.

The single component oxide layer 112 is preferably made of a material having a high dielectric constant, even though a large amount of leakage current may thereby occur, exhibiting a small change in the equivalent oxide film thickness even when it is thickly formed. Thus, the single component oxide layer 112 may be made of an oxide having a dielectric constant of 20 or more, in particular, of a material such as tantalum oxide ($Ta_2O_5$).

The single component oxide layer 112 may be formed using deposition methods, such as chemical vapor deposition (CVD), low pressure chemical vapor deposition (LP CVD), plasma enhanced chemical vapor deposition (PE CVD), and sputtering. The single component oxide layer 112 is typically formed at a relatively higher temperature using such methods. Consequently, according to these methods, thermal effects that are disadvantageous to semiconductor devices may result from such deposition processes.

On the other hand, an atomic layer deposition (ALD) process may be effectively performed at a lower temperature than CVD. As a result, when the ALD process is used, deleterious thermal effects are reduced and uniformity is enhanced. Thus, in the manufacturing of the dielectric film 100'' according to the third embodiment of the present invention, the single component oxide layer 112 may preferably be formed using an ALD process. By using the ALD process, a variety of precursors can be used and the thickness of a layer can be precisely controlled. The ALD process of forming the single component oxide layer 112 may be accomplished, for example, by repeating a cycle of sequentially supplying a metal or nonmetal source, a purge gas, an oxygen source, and a purge gas. By repeating the above process, the single component oxide layer 112 is preferably formed at a thickness in a range of about 30 to 300 Å.

The metal or nonmetal source may be one material with a component selected from the group consisting of aluminum (Al), hafnium (Hf), zirconium (Zr), lanthanum (La), silicon (Si), tantalum (Ta), strontium (Sr), barium (Ba), lead (Pb), chromium (Cr), molybdenum (Mo), tungsten (W), titanium (Ti), yttrium (Y), and manganese (Mn). In addition, the oxygen source may, for example, be $H_2O$, $O_3$, O radical, alcohol (e.g., isopropylalcohol), $D_2O$, $H_2O_2$, $O_2$, $N_2O$ or NO. In addition, other suitable oxygen sources within the spirit and scope of the present invention may also be used.

Subsequently, a second composite components oxide layer is formed on the single component oxide layer in operation S4 of FIG. 6.

Hereinafter, the composite components oxide layer formed on the single component oxide layer 112 is referred to as a second composite components oxide layer 113'. The second composite components oxide layer 113' may be formed using deposition methods such as chemical vapor deposition (CVD), low pressure chemical vapor deposition (LP CVD), plasma enhanced chemical vapor deposition (PE CVD), and sputtering, as described above with respect to the first composite components oxide layer 111', or, alternatively, an ALD process may be used for this step. The second composite components oxide layer 113' is formed so as to have no layered structure, and layer 113' may be thermally processed using the same methods as described above for the first composite components oxide layer 111' so as to improve the interface characteristics of layer 113'.

Figure 6:
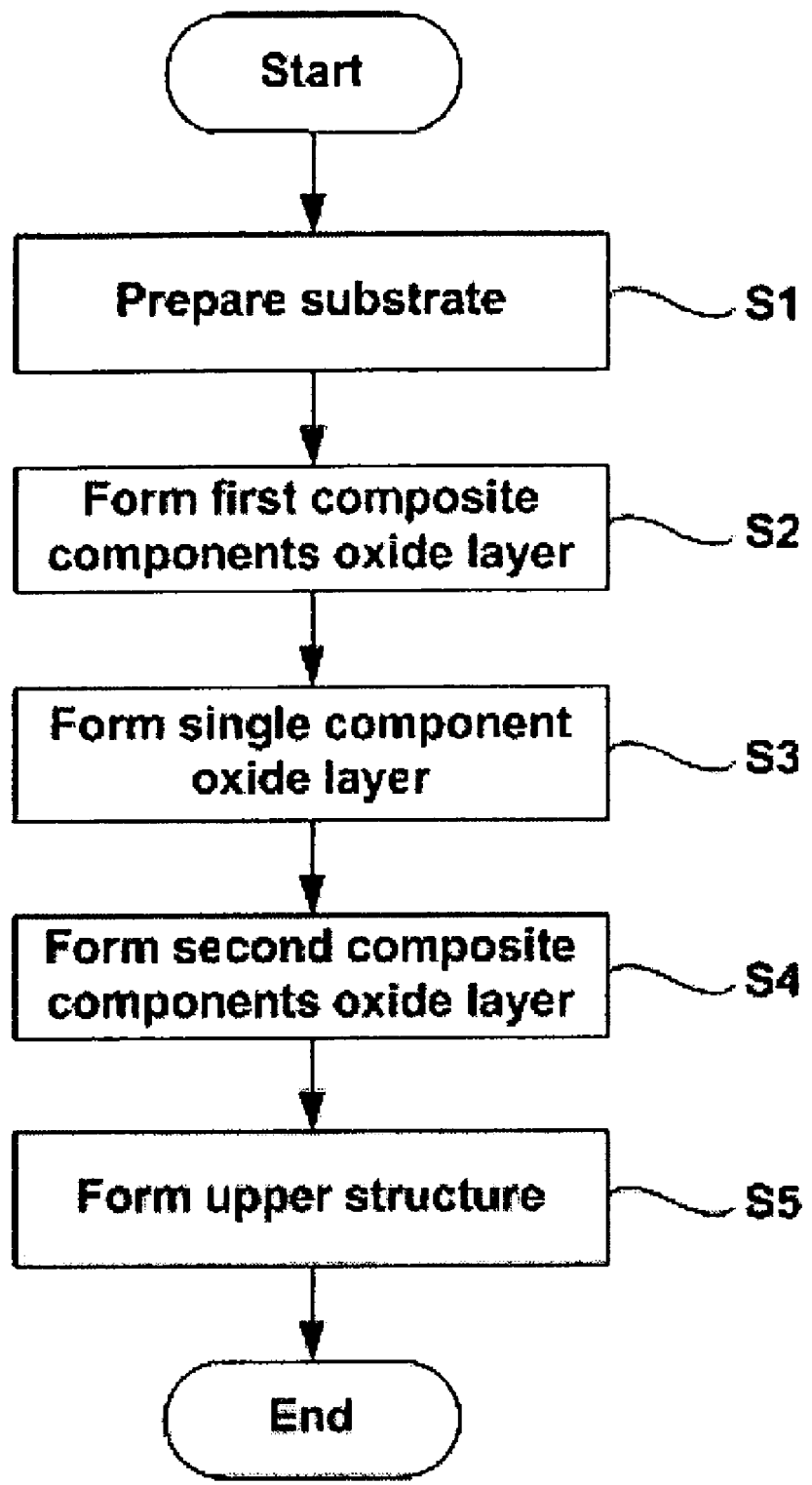
FIG. 6 is a process flowchart illustrating a method of manufacturing a dielectric film according to the third embodiment of the present invention.

In the last step of the process shown in FIG. 6, an upper structure is formed in operation S5.

The upper structure (such as the upper electrode 230 of FIG. 4 or the like) is formed on the resultant structure after the second composite components oxide layer 113' has been formed. When a dielectric film according to the present invention is formed, polysilicon that is widely used in a conventional mass production process may be used without changes such that the upper structure can be formed.

A dielectric film manufactured using the above-described manufacturing processes includes first and second composite components oxide layers, each formed without a layered structure, sandwiching a single component oxide layer having a high dielectric constant. As a result of such a structure, typical dielectric problems of a leakage current and breakdown voltage deterioration can be solved.

Figure 7:
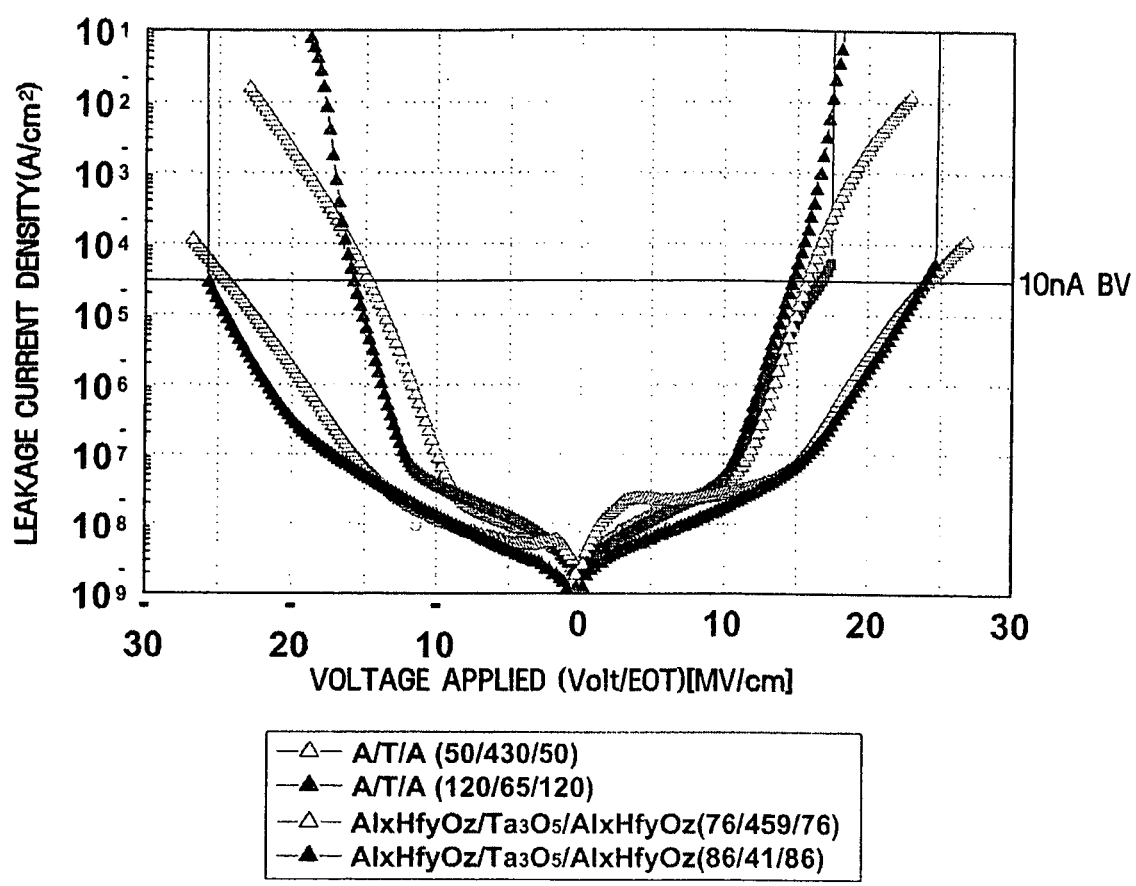
FIG. 7 is a graph comparing the leakage current characteristics of capacitors including an $Al_2O_3/Ta_2O_5/Al_2O_3$ (A/T/A)

FIG. 7 is a graph comprising the leakage current characteristics of two capacitors, each including an $Al_xHf_yO_z/Ta_2O_5/Al_xHf_yO_z$ dielectric film according to an embodiment of the present invention, with two capacitors, each including an $Al_2O_3/Ta_2O_5/Al_2O_3$ (hereinafter, to be abbreviated as A/T/A) dielectric film, which is not formed according to an embodiment of the present invention.

FIG. 7 compares the leakage current characteristics of a capacitor having an $Al_xHf_yO_z/Ta_2O_5/Al_xHf_yO_z$ dielectric film, the components of which have thicknesses of 76 Å, 459 Å and 76 Å, respectively, and an $Al_xHf_yO_z/Ta_2O_5/Al_xHf_yO_z$ dielectric film, the components of which have thicknesses of 86 Å, 41 Å and 86 Å, respectively, with a capacitor having an A/T/A dielectric film, the components of which have thicknesses of 50 Å, 430 Å and 50 Å, respectively, and a capacitor having an A/T/A dielectric film, the components of which have thicknesses of 120 Å, 65 Å and 120 Å, respectively. As seen in FIG. 7, the leakage current characteristics of the capacitors having an $Al_xHf_yO_z/Ta_2O_5/Al_xHf_yO_z$ dielectric film are better than the capacitors having an A/T/A dielectric film. That is, on the assumption of the equivalent oxide thickness being the same, a 10 nA breakdown voltage(10 nA BV) of the two dielectric films made of $Al_xHf_yO_z/Ta_2O_5/Al_xHf_yO_z$ are about 1.5 times higher than that of the dielectric films made of A/T/A. It can be concluded from this data that the dielectric film having a composite components oxide layer structure is induced so that capacitance per unit area of the dielectric film having a 10 nA breakdown voltage of 15 V can be higher than the prior art capacitance, i.e., 3 $fF/\mu m^2$.

As described above, in the multi-layered dielectric films for microelectronic devices and the methods of manufacturing the same according to the present invention, the dielectric film including a composite components oxide layer structure is used in fabricating a microelectronic device requiring the property of capacitance such that a capacitor element of such a device having large capacitance per unit area can be manufactured. Thus, since a boosting frequency can thereby be reduced, power dissipation is reduced such that a microelectronic device with low power dissipation can be manufactured.

Also, because a microelectronic device can be fabricated with a capacitor in accordance with this invention having the same capacitance as the prior art device but which can be made smaller than the prior art devices, the size of a chip can thereby be reduced and high integration can be easily achieved.

In addition, a higher breakdown voltage is thus realized, and it is possible to manufacture a microelectronic device, for example, a capacitor, having improved electrical characteristics, including improved leakage current and reliability characteristics.

While the present invention has been particularly shown and described with reference to exemplary embodiments thereof, it will be understood by those skilled in the art that various changes in form and details may be made therein without departing from the spirit and scope of the invention as defined by the following claims and equivalents thereof.

What is claimed is:

1. A multi-layered dielectric film comprising:
a single component oxide layer; and
composite components oxide layers each of the composite components oxide layers being without a layered structure and formed along either side of the single component oxide layer, further wherein the composite components oxide layers consist of a composite components oxide represented by the general chemical formula $M1_xM2_yO_z$, wherein M1 and M2 may be the same or different components selected from the group consisting of aluminum (Al), hafnium (Hf), zirconium (Zr), lanthanum (La), tantalum (Ta), strontium (Sr), barium (Ba), lead (Pb), chromium (Cr), molybdenum (Mo), tungsten (W), titanium (Ti), yttrium (Y), and manganese (Mn), and wherein x, y and z have numerical values that denote the stoichiometric ratio of M1, M2 and O.

2. The multi-layered dielectric film of claim 1, wherein the single component oxide layer has a higher dielectric constant than that of the composite components oxide layers.

3. The multi-layered dielectric film of claim 1, wherein the single component oxide layer comprises a single component oxide wherein the component is selected from the group consisting of aluminum (Al), hafnium (Hf), zirconium (Zr), lanthanum (La), silicon (Si), tantalum (Ta), strontium (Sr), barium (Ba), lead (Pb), chromium (Cr), molybdenum (Mo), tungsten (W), titanium (Ti), yttrium (Y), and manganese (Mn).

4. The multi-layered dielectric film of claim 3, wherein the single component oxide layer comprises tantalum oxide.

5. The multi-layered dielectric film of claim 1 wherein at least one of the composite components oxide layers comprises at least one of a composite components oxide selected from the group consisting of $Al_xHf_yO_z$, $Al_xTa_yO_z$, $Hf_xTa_yO_z$, $Hf_xTi_yO_z$, $Al_xTi_yO_z$, $Zr_xTa_yO_z$, and $Zr_xTi_yO_z$.

6. The multi-layered dielectric film of claim 1 wherein at least one of the composite components oxide layers comprises $Al_xHf_yO_z$.

7. The multi-layered dielectric film of claim 1 wherein each of the composite components oxide layers has a dielectric constant ($\epsilon$) in the range of $9<\epsilon<30$.

8. The multi-layered dielectric film of claim 1, wherein at least one of the composite components oxide layers formed along either side of the single component oxide layer is thermally treated.

9. The multi-layered dielectric film of claim 1, wherein at least one of the composite components oxide layers formed along either side of the single component oxide layer comprises components wherein at least one is the same component as in the single component oxide layer.

10. The multi-layered dielectric film of claim 1, wherein at least one of the composite components oxide layers formed along either side of the single component oxide layer comprises different components than the component of the single component oxide layer.

11. Microelectric device comprising a multi-layered dielectric film according to claim 1 as a dielectric film for a capacitor.

12. A capacitor comprising:
a lower electrode;
a multi-layered dielectric film including composite components oxide layers made of $Al_xHf_yO_z$, wherein x, y and z have numerical values that denote the stoichiometric ratio of Al, Hf and O, formed along either side of a single component oxide layer made of a tantalum oxide, said multi-layered dielectric film being formed on the lower electrode; and
an upper electrode formed on the multi-layered dielectric film.

13. The capacitor of claim 12, wherein at least one of the composite components oxide layers has a dielectric constant ($\epsilon$) in the range of $9<\epsilon<30$.

14. The capacitor of claim 12, wherein the upper electrode and the lower electrode are each made of TiN.

* * * * *